United States Patent
Lin et al.

(10) Patent No.: US 12,421,775 B2
(45) Date of Patent: Sep. 23, 2025

(54) HINGE WITH MOVABLE ROTATING AXLE

(71) Applicant: FOSITEK CORPORATION, New Taipei (TW)

(72) Inventors: Chun-Han Lin, New Taipei (TW); Yung-Chih Tseng, New Taipei (TW); Zoen Ryon Ryan Wong, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 134 days.

(21) Appl. No.: 18/428,529

(22) Filed: Jan. 31, 2024

(65) Prior Publication Data

US 2025/0188776 A1   Jun. 12, 2025

(30) Foreign Application Priority Data

Dec. 8, 2023  (TW) .................................. 112147852

(51) Int. Cl.
  *E05D 3/02* (2006.01)
  *G06F 1/16* (2006.01)

(52) U.S. Cl.
  CPC ............. *E05D 3/02* (2013.01); *G06F 1/1681* (2013.01); *E05Y 2999/00* (2024.05)

(58) Field of Classification Search
  CPC ........... E05D 3/02; E05D 3/022; E05D 5/121; E05D 11/087; E05D 11/081; E05D 11/1028; G06F 1/1681; E05Y 2999/00
  See application file for complete search history.

(56) References Cited

U.S. PATENT DOCUMENTS

| | | | |
|---|---|---|---|
| 510,864 A * | 12/1893 | Johnson | E05D 11/1007 16/348 |
| 553,650 A * | 1/1896 | Kingsland | F16G 13/20 254/134.7 |
| 3,083,403 A * | 4/1963 | Van Noord | E05D 3/18 16/361 |
| 7,353,569 B2 * | 4/2008 | Chen | G06F 1/1601 16/377 |
| 7,784,154 B2 * | 8/2010 | Chen | G06F 1/1616 16/337 |

(Continued)

FOREIGN PATENT DOCUMENTS

| | | | | |
|---|---|---|---|---|
| DE | 102020108110 B3 * | 11/2020 | | E05D 7/04 |
| EP | 3075930 A1 * | 10/2016 | | E05D 7/04 |
| WO | WO-2006136939 A2 * | 12/2006 | | E05D 7/1061 |

*Primary Examiner* — Jason W San
*Assistant Examiner* — Matthew J Sullivan
(74) *Attorney, Agent, or Firm* — Burris Law, PLLC

(57) ABSTRACT

A hinge connectable between a first device part and a second device part includes a base seat unit and a rotating unit. The base seat unit includes first and second base seat for connecting with the first and second device parts. A base plate of the first base seat is formed with a moving slot having a first slot portion and a second slot portion. The rotating unit includes a rotating axle movably extending through the moving slot and rotated with the second base seat, a linkage pivotally connected between the base plate and the rotating axle, and a cam piece rotated with the rotating axle. During rotation of the rotating axle and the cam piece with the second base seat, a first protrusion of the cam piece is moved along a lower edge of the first slot portion to bring the rotating axle into an upward movement.

6 Claims, 22 Drawing Sheets

(56) References Cited

U.S. PATENT DOCUMENTS

| | | | | |
|---|---|---|---|---|
| 8,281,459 | B2* | 10/2012 | Le | E05D 3/022 |
| | | | | 16/361 |
| 9,605,457 | B2* | 3/2017 | Humble | E05D 7/04 |
| 10,100,564 | B2* | 10/2018 | Lapchev | E05D 3/022 |
| 10,113,346 | B2* | 10/2018 | Kohlweiss | E05D 5/02 |
| 10,329,814 | B1* | 6/2019 | Tamer | E05D 11/1007 |
| 10,330,370 | B2* | 6/2019 | Choi | E06B 5/006 |
| 10,494,845 | B2* | 12/2019 | Yamaguchi | E05D 3/16 |
| 10,754,392 | B2* | 8/2020 | Wendt | G06F 1/1679 |
| 11,313,162 | B2* | 4/2022 | Olkay | E05D 7/1061 |
| 11,415,200 | B2* | 8/2022 | Hsiao | G06F 1/1681 |
| 11,585,133 | B2* | 2/2023 | Earl | E05D 5/0207 |
| 11,808,069 | B2* | 11/2023 | Martin | E05D 3/02 |
| 11,829,207 | B2* | 11/2023 | Lin | G06F 1/1681 |
| 12,139,949 | B2* | 11/2024 | Mitsui | H04M 1/0216 |
| 2006/0200945 | A1* | 9/2006 | Lu | G06F 1/1616 |
| | | | | 16/340 |
| 2007/0050942 | A1* | 3/2007 | Hu | F16M 11/10 |
| | | | | 16/340 |
| 2011/0047751 | A1* | 3/2011 | Chen | G06F 1/1681 |
| | | | | 361/679.55 |
| 2017/0152690 | A1* | 6/2017 | Knoechel | E05D 5/06 |
| 2023/0366249 | A1* | 11/2023 | Nöthe | E05D 3/02 |

* cited by examiner

HINGE WITH MOVABLE ROTATING AXLE

CROSS-REFERENCE TO RELATED APPLICATION

This application claims priority to Taiwanese Patent Application No. 112147852, filed on Dec. 8, 2023, and incorporated by reference herein in its entirety.

FIELD

The disclosure relates to a hinge for an electronic device, and more particularly to a hinge with a movable rotating axle.

BACKGROUND

Electronic devices, such as laptop computers utilize a hinge with a fixed rotating axle to connect an upper cover and a housing shell to open and close the upper cover relative to the housing shell. One of the upper cover and the housing shell is formed with a chamfer to avoid interfering of the upper cover and the housing shell with each other when the upper cover is turned relative to the housing shell. However, there is no clearance therebetween during opening of the upper cover, which adversely affects heat dissipation of the electronic device.

SUMMARY

Therefore, an object of the disclosure is to provide a hinge that can alleviate at least one of the drawbacks of the prior art.

According to the disclosure, the hinge connectable between a first device part and a second device part to permit the second device part to rotate relative to the first device part includes a base seat unit and a rotating unit. The base seat unit includes a first base seat for connecting with the first device part, and a second base seat for connecting with the second device part. The first base seat has a base plate. The base plate has a first side, a second side opposite to the first side, an upper side and a lower side opposite to the upper side. The base plate is formed with a moving slot which has a first slot portion that extends from the first side toward the second side, and a second slot portion that is in communication with the first slot portion and that extends from the first slot portion toward the upper side. The rotating unit includes a rotating axle which movably extends through the moving slot and which is securely connected with the second base seat so as to be rotated with the second base seat, a linkage which is pivotally connected between the base plate and the rotating axle, and a cam piece which is securely mounted on the rotating axle. The cam piece has a cam surrounding portion which is securely sleeved on the rotating axle, and a first protrusion which projects radially from the cam surrounding portion and which is movably disposed in the first slot portion. The second base seat is driven to rotate the rotating unit between an initial position, where the rotating axle is located in the first slot portion and the first protrusion of the cam piece is located in the first slot portion adjacent to the first side, and a first rotating position. During rotation of the rotating axle and the cam piece, the first protrusion of the cam piece abuts against and is moved along a lower edge of the first slot portion to bring the rotating axle into an upward movement into the second slot portion and bring the linkage into an upward pivoting action so as to move the rotating unit to the first rotating position.

With the second base seat driven to rotate by the rotating axle and the cam piece, and with the first protrusion of the cam piece abutting against and moved along the lower edge of the first slot portion, the rotating axle is moved upwardly to the second slot portion to bring the linkage into an upward pivoting action so as to move the rotating unit to the first rotating position. At this stage, the rotating axle is raised to increase the projected length of the linkage in the horizontal direction, and a height difference of the second device part from the first device part is created to create more clearance therebetween. Thus, interference of the second device part with the first device part during the rotation is avoided.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
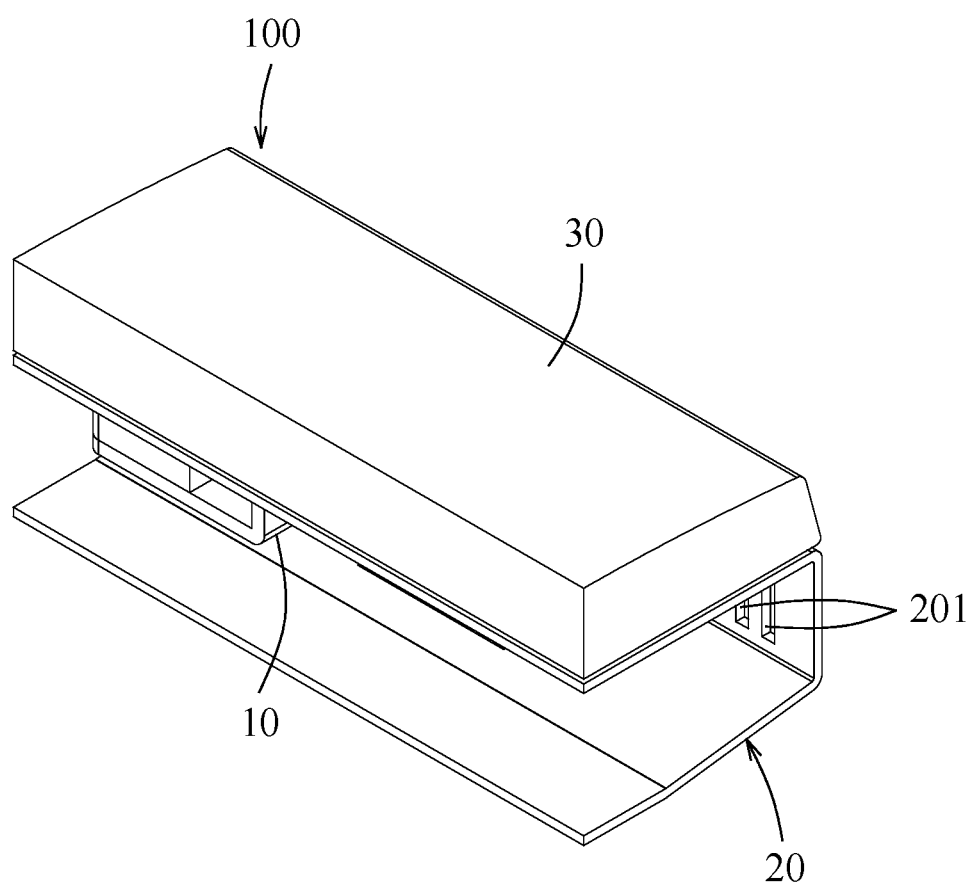
FIG. 1 is a perspective view illustrating an embodiment of a hinge according to the disclosure disposed on an electronic device and in a state when a rotating unit of the embodiment is in an initial position.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
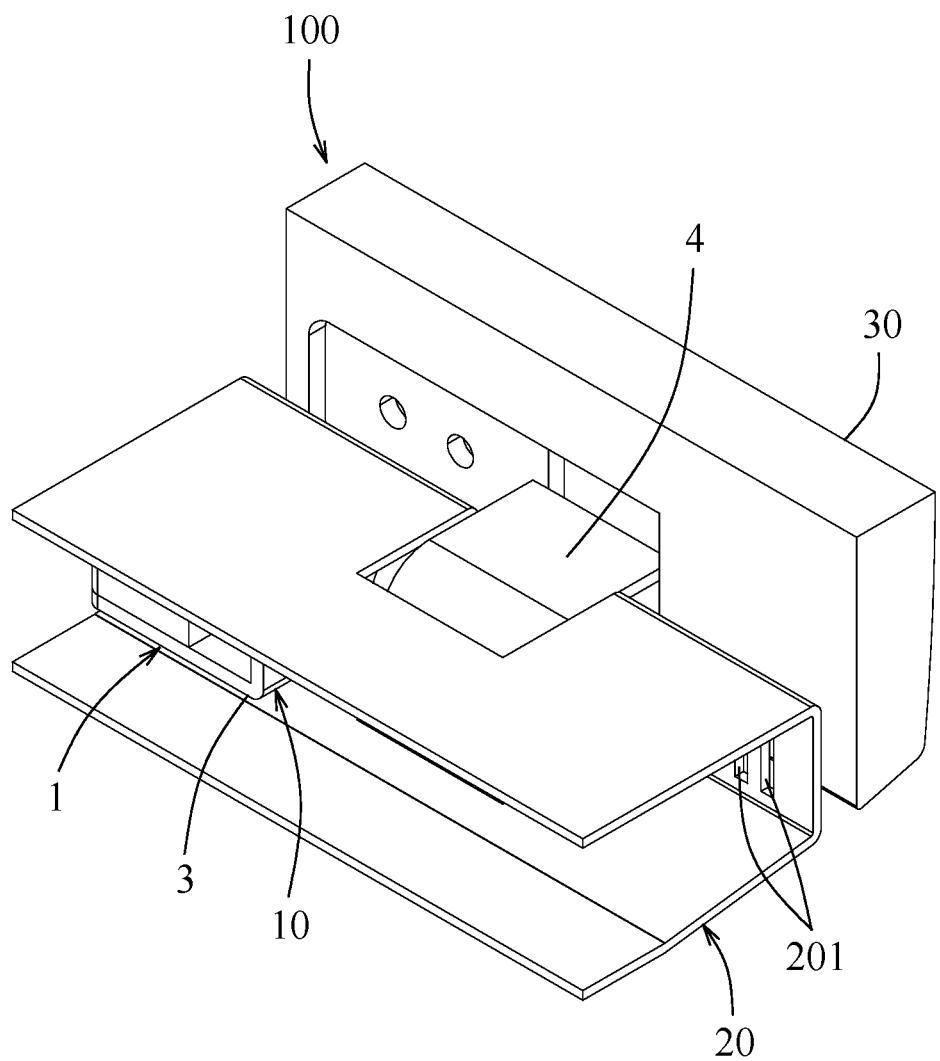
FIG. 2 is a perspective view similar to FIG. 1, illustrating the rotating unit in a first rotating position.
Figure 3:
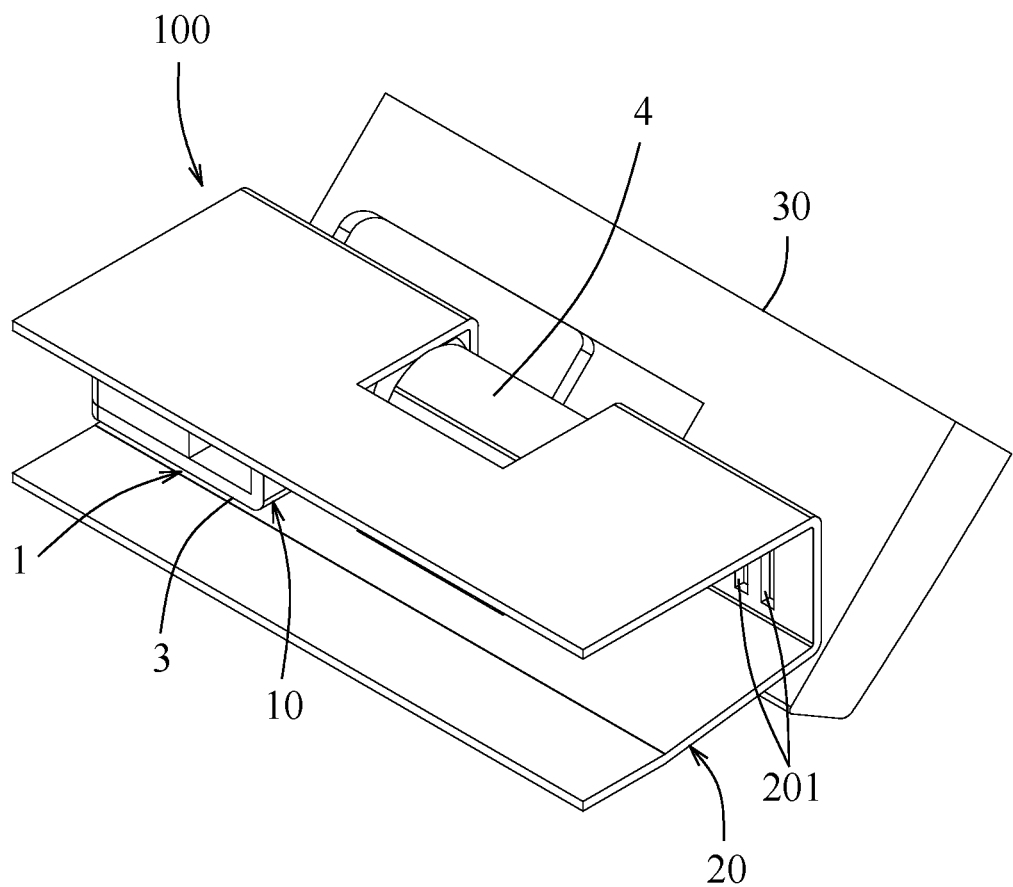
FIG. 3 is a perspective view similar to FIG. 1, illustrating the rotating unit in a second rotating position.

Referring to FIGS. 1 to 3, an embodiment of a hinge 10 according to the disclosure is connectable between a first device part 20 and a second device part 30 of an electronic device 100 to permit the second device part 30 to rotate relative to the first device part 20. For example, the electronic device 100 may be a foldable mobile phone, tablet, tablet PC, or portable PC, or so forth. The electronic device 100 is a tablet PC in this embodiment, and the first device part 20 is a part of a portion on which a keyboard or a sub-screen is disposed, and has a plurality of heat dissipating holes 201. The second device part 30 is a part of a main screen. The hinge 10 includes a base seat unit 1 and a rotating unit 2 (as shown in FIG. 4).

Figure 4:
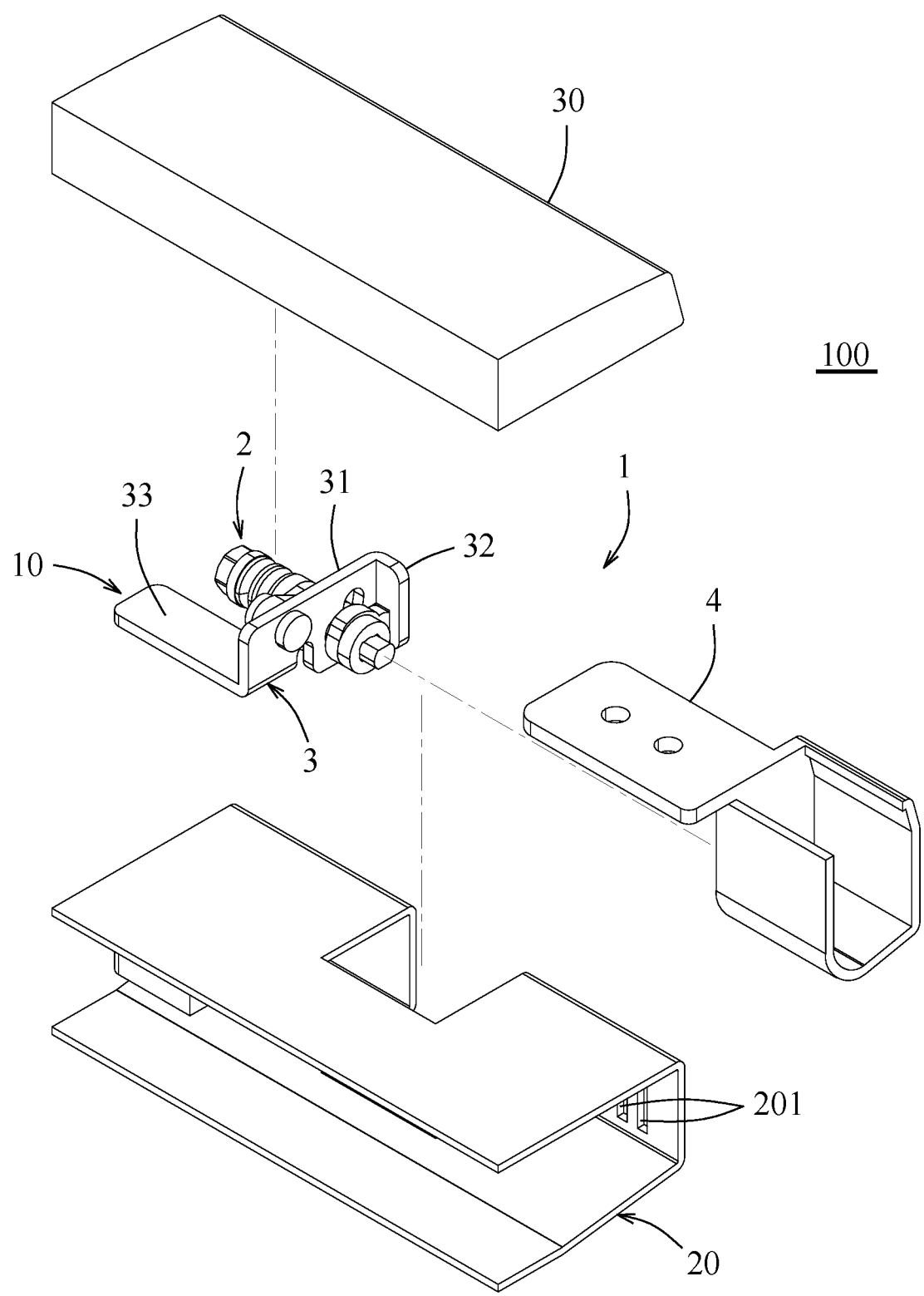
FIG. 4 is an exploded perspective view of the embodiment disposed between a first device part and a second device part of an electronic device.
Figure 5:
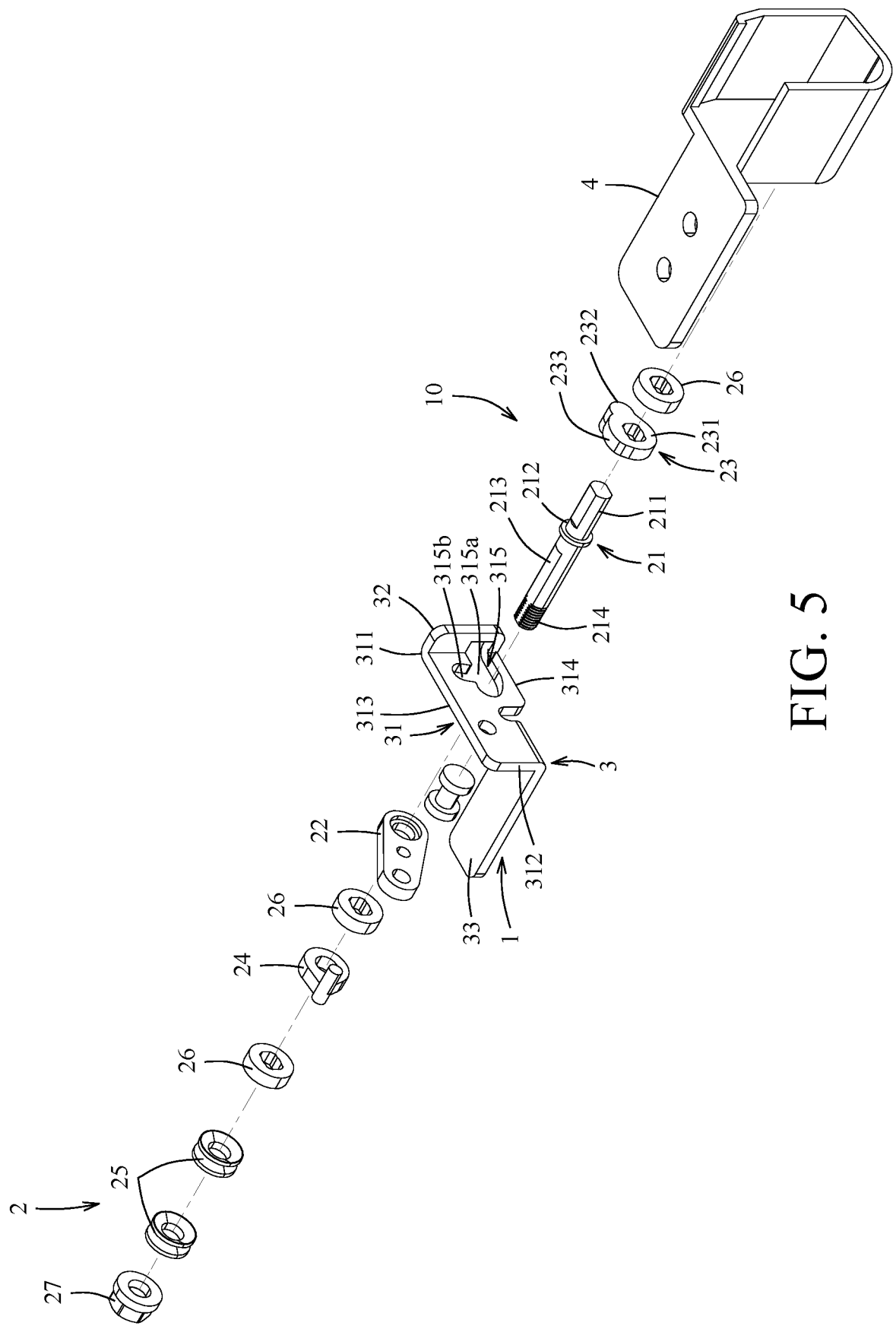
FIG. 5 is an exploded perspective view of the embodiment.
Figure 6:
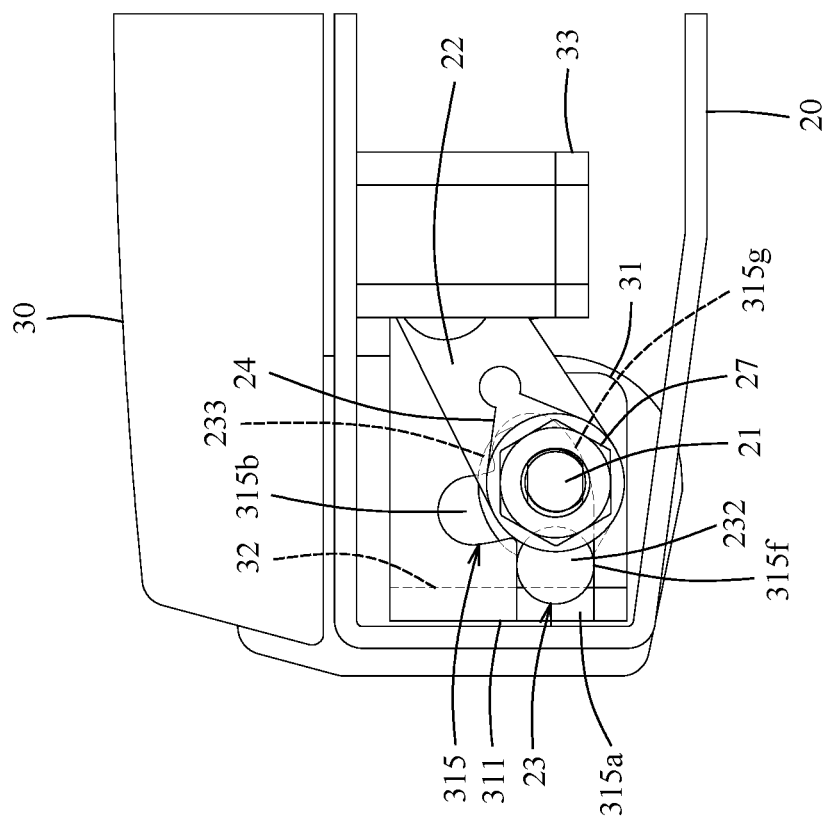
FIGS. 6 and 7 are a left side view and a right side view of the embodiment, illustrating the rotating unit in the initial position.

With reference to FIGS. 4 and 5, the base seat unit 1 includes a first base seat 3 for connecting with the first device part 20, and a second base seat 4 for connecting with the second device part 30. The first base seat 3 has a base plate 31, a lateral plate 32 and a connecting plate 33. The base plate 31 has a first side 311, a second side 312 opposite to the first side 311, an upper side 313 and a lower side 314 opposite to the upper side 313. The base plate 31 is formed with a moving slot 315 in a major plate wall thereof. The moving slot 315 has a first slot portion (315a) which extends from the first side 311 toward the second side 312, and a second slot portion (315b) which is in communication with the first slot portion (315a) and which extends upwardly from the first slot portion (315a) toward the upper side 313. Referring to FIG. 6, a lower edge of the first slot portion (315a) has a horizontal surface (315f) which extends horizontally from the first side 311, and an upward curved surface (315g) which extends from the horizontal surface (315f) and is curved upwardly to border a distal end of the first slot portion (315a) that is remote from the first side 311. The lateral plate 32 extends from the first side 311 and is transverse to the base plate 31. In this embodiment, the lateral plate 32 extends vertically. The connecting plate 33 is connected with the lower side 314 of the base plate 31 adjacent to the second side 312 and extends horizontally for connecting with the first device part 20.

The rotating unit 2 includes a rotating axle 21 which movably extends through the moving slot 315 and which is securely connected with the second base seat 4 so as to be rotated with the second base seat 4, a linkage 22 which is pivotally connected between the base plate 31 and the rotating axle 21, a cam piece 23 which is securely mounted on the rotating axle 21, a friction disc 24 which is sleeved on the rotating axle 21 and which is connected with the linkage 22, two torsion discs 25 which are movably sleeved on the rotating axle 21, three washers 26 which are securely sleeved on the rotating axle 21, and a screw nut 27 which is threadedly engaged with the rotating axle 21 and which abuts against one of the torsion discs 25. The rotating axle 21 has a first extending section 211 which is in spine engagement with the second base seat 4, the cam piece 23 and one of the washers 26, a connecting section 212 which extends from the first extending section 211 and on which the linkage 22 is sleeved, a second extending section 213 which extends from the connecting section 212 to extend through the friction disc 24, the torsion discs 25 and the other two washers 26, and a threaded section 214 which extends from the second extending section 213 to be threadedly engaged with the screw nut 27. The cam piece 23 has a cam surrounding portion 231 which is securely sleeved on the rotating axle 21, a first protrusion 232 which projects radially from the cam surrounding portion 231 and which is movably disposed in the first slot portion (315a), and a second protrusion 233 which projects radially from the cam surrounding portion 231 and which is angularly spaced apart from the first protrusion 232. One of the washers 26 abuts against the cam piece 23, another washer 26 abuts against and is interposed between the linkage 22 and the friction disc 24, and the other washer 26 abuts against and is interposed between the friction disc 24 and one of the torsion discs 25. One end of the torsion discs 25 abuts against the washer 26, and the opposite end thereof abuts against the screw nut 27. With the frictional forces generated between the torsion discs 25 and the washer 26 and between the torsion discs 25 and the screw nut 27, a friction torque is produced during operation of the hinge 10.

Figure 7:
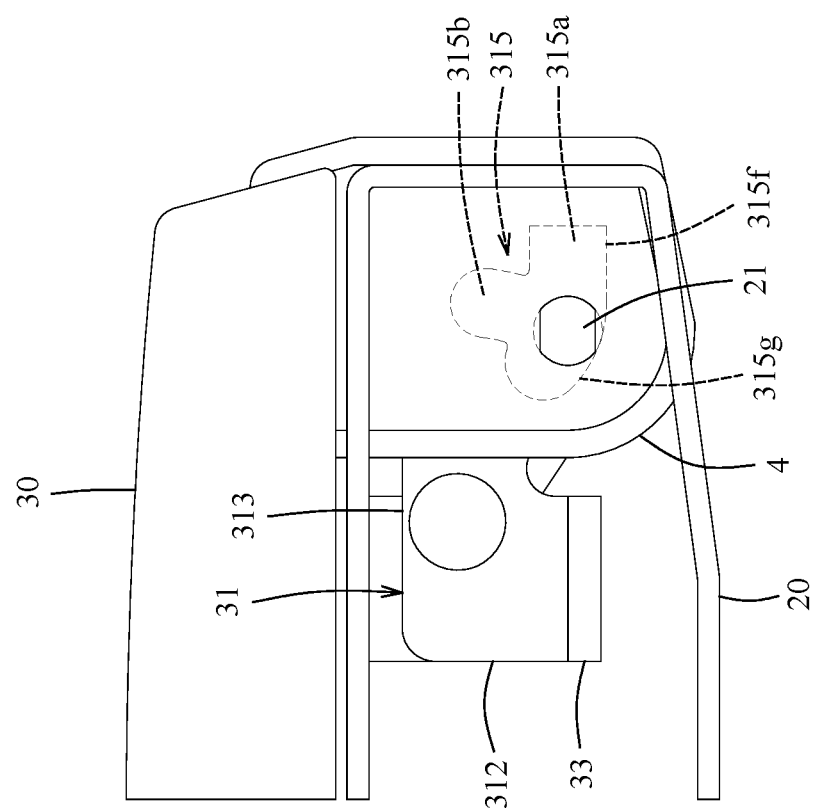
Figure 8:
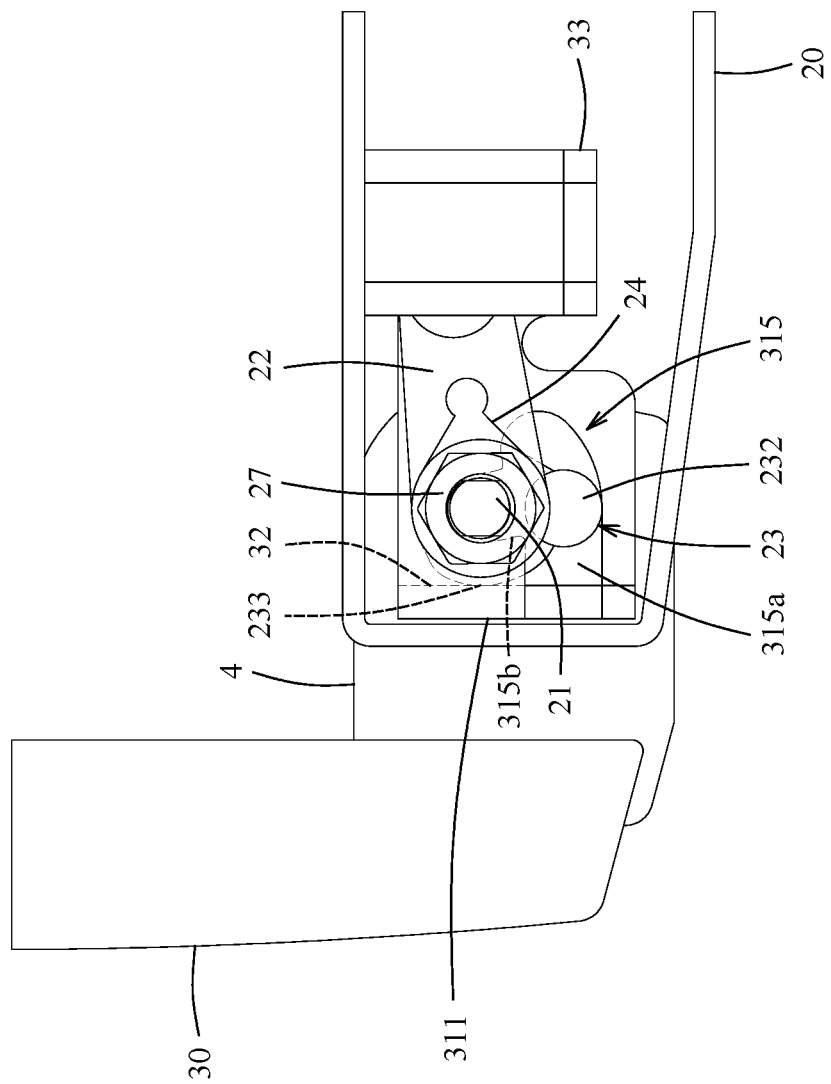
FIGS. 8 and 9 are a left side view and a right side view of the embodiment, illustrating the rotating unit in the first rotating position.
Figure 9:
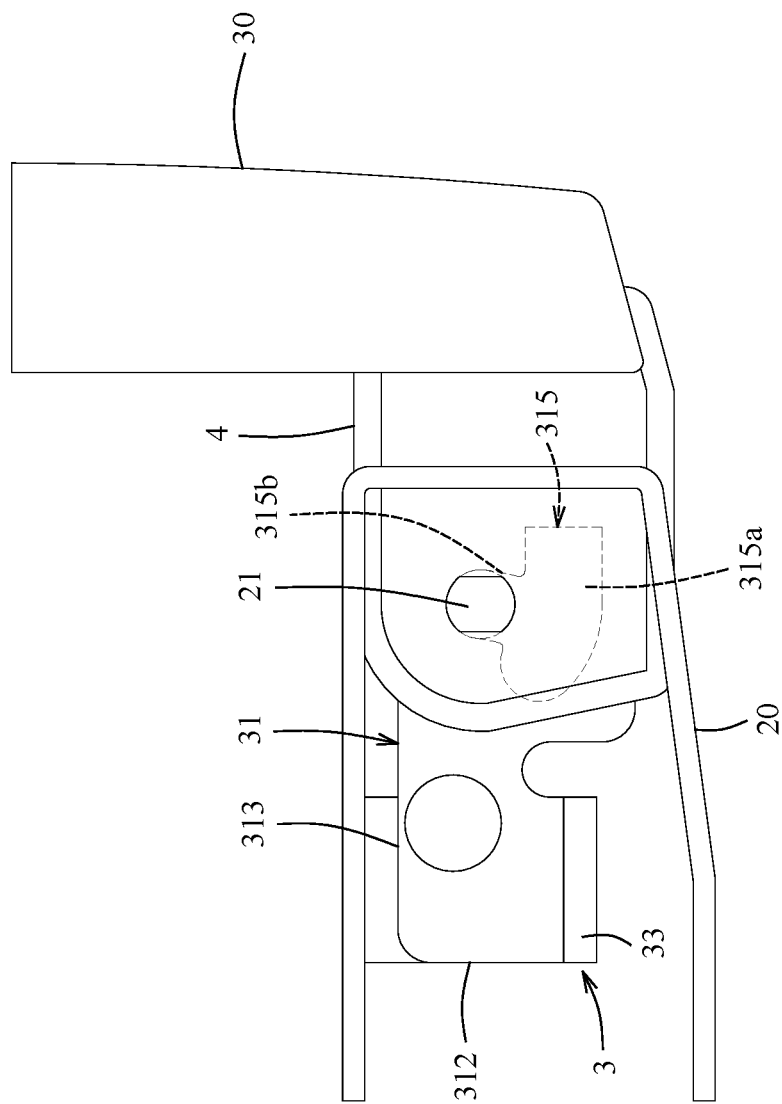
Figure 10:
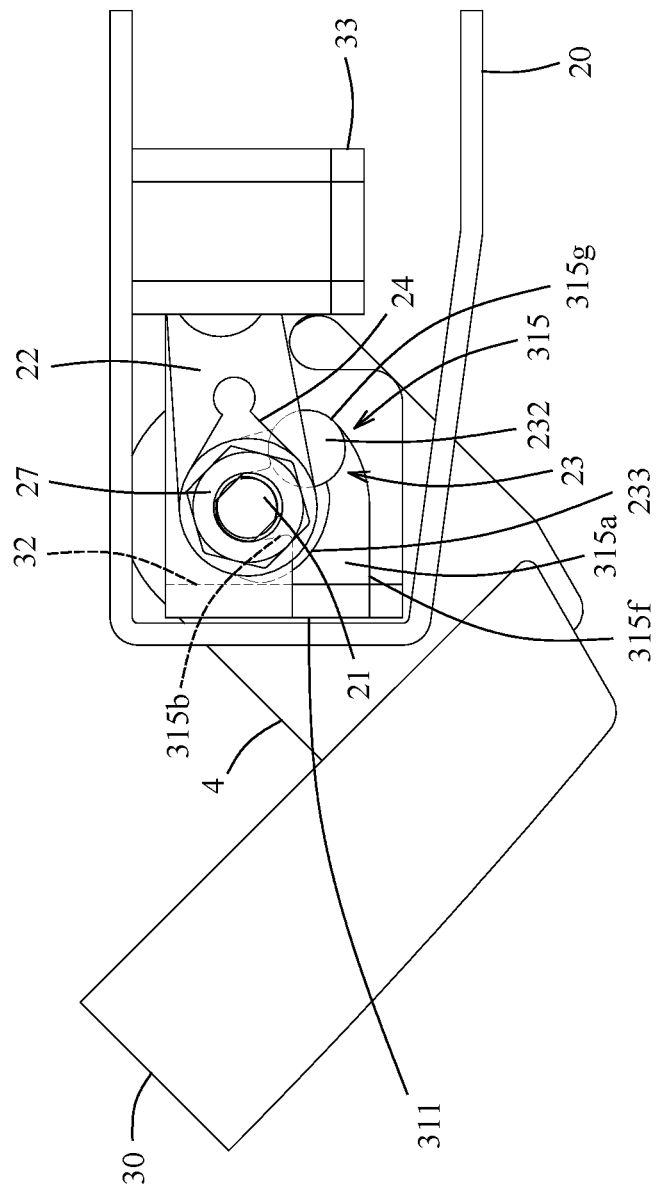
FIGS. 10 and 11 are a left side view and a right side view of the embodiment, illustrating the rotating unit in the second rotating position.
Figure 11:
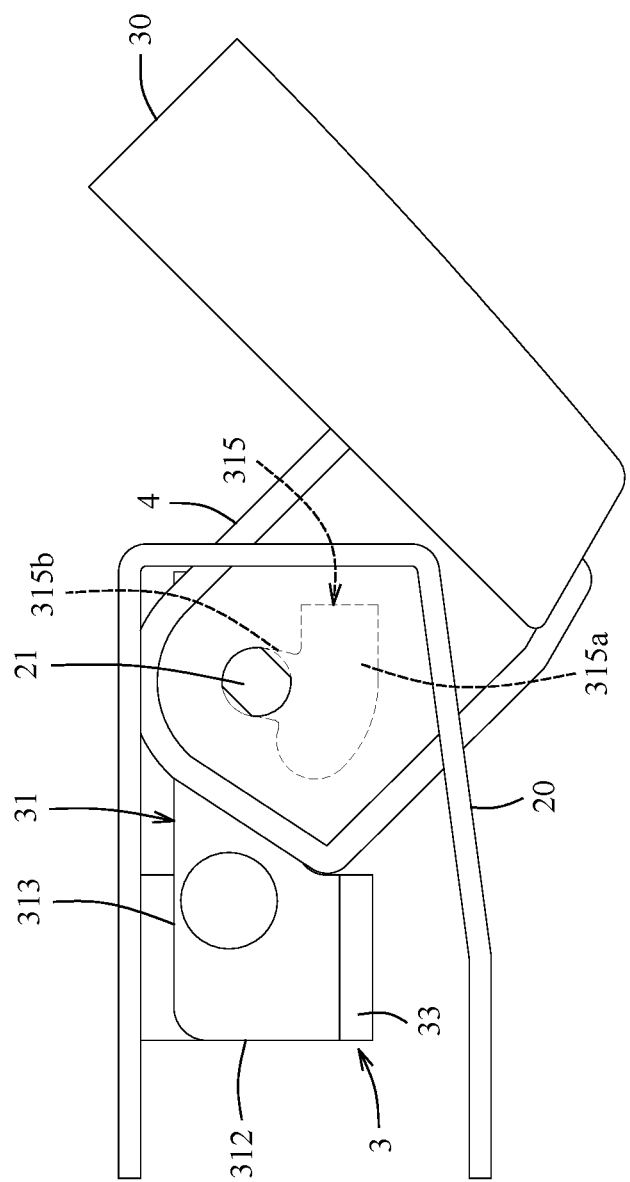
Figure 12:
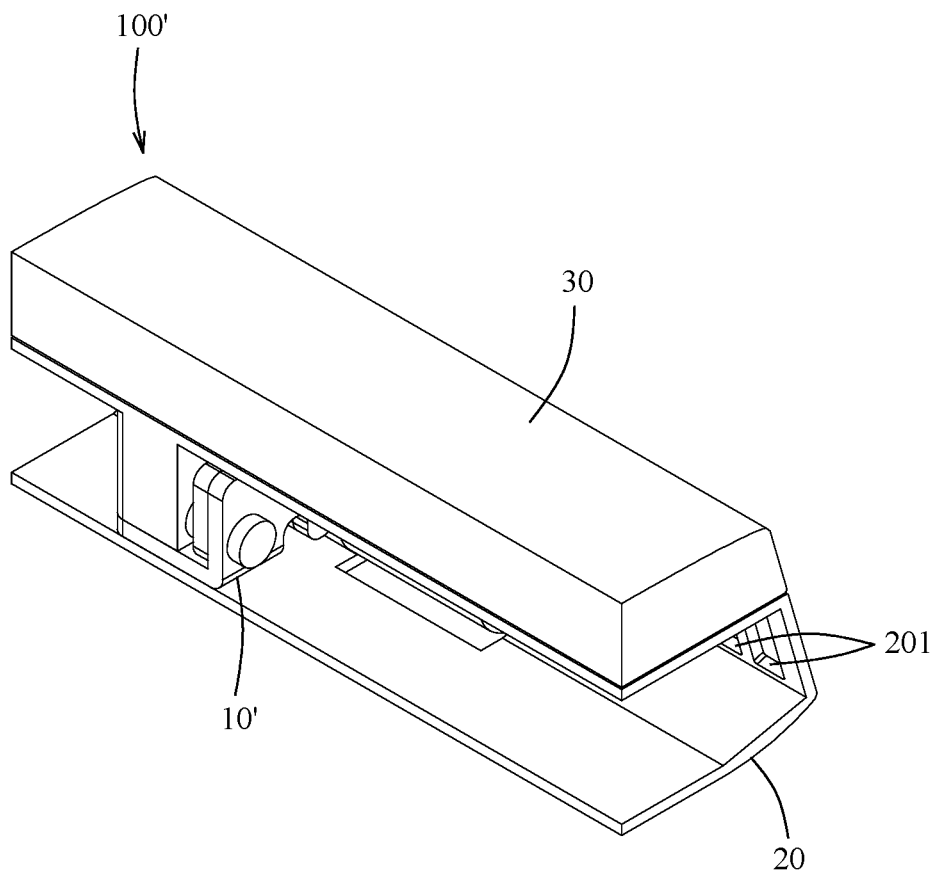
FIG. 12 is a perspective view illustrating another embodiment of a hinge according to the disclosure disposed on an electronic device and in a state when a rotating unit of the embodiment is in an initial position.
Figure 13:
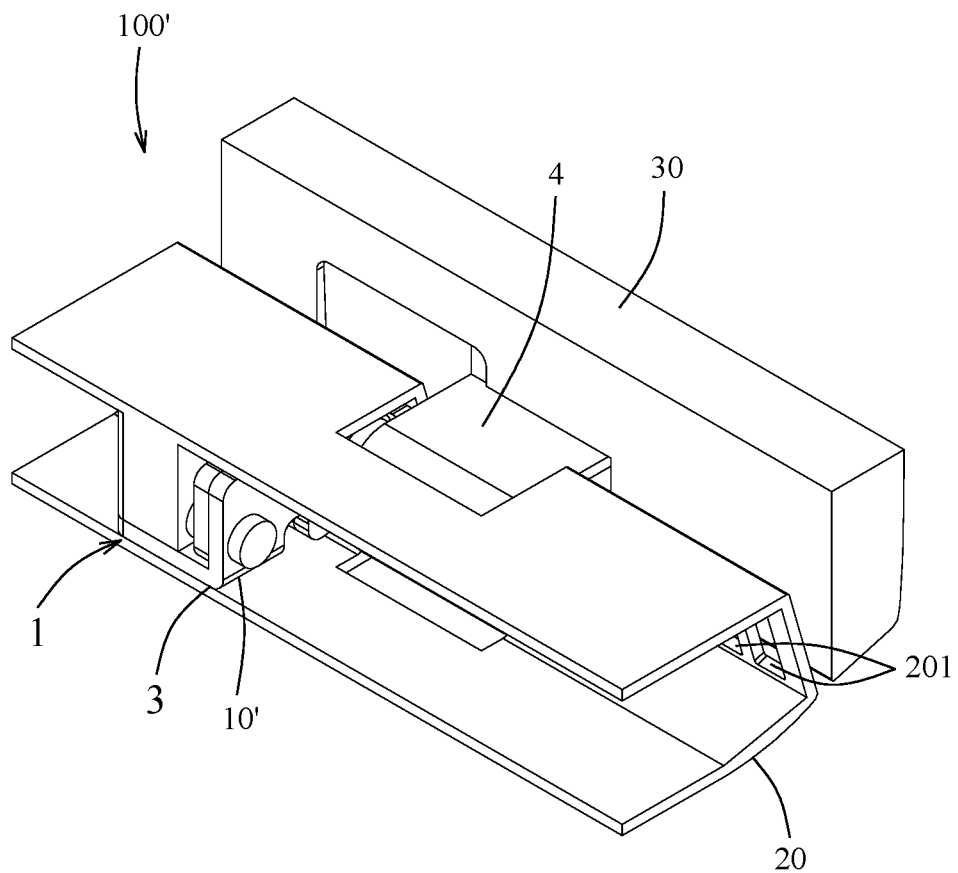
FIG. 13 is a perspective view similar to FIG. 12, illustrating the rotating unit in a first rotating position.
Figure 14:
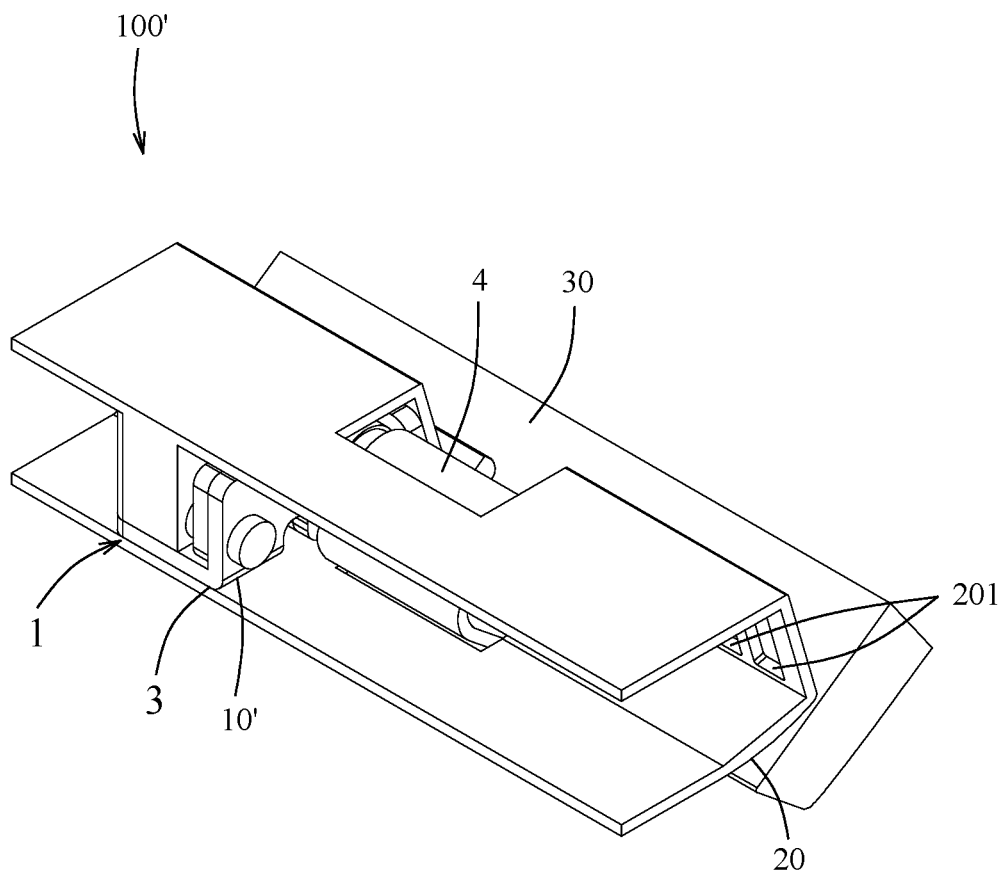
FIG. 14 is a perspective view similar to FIG. 12, illustrating the rotating unit in a second rotating position.
Figure 15:
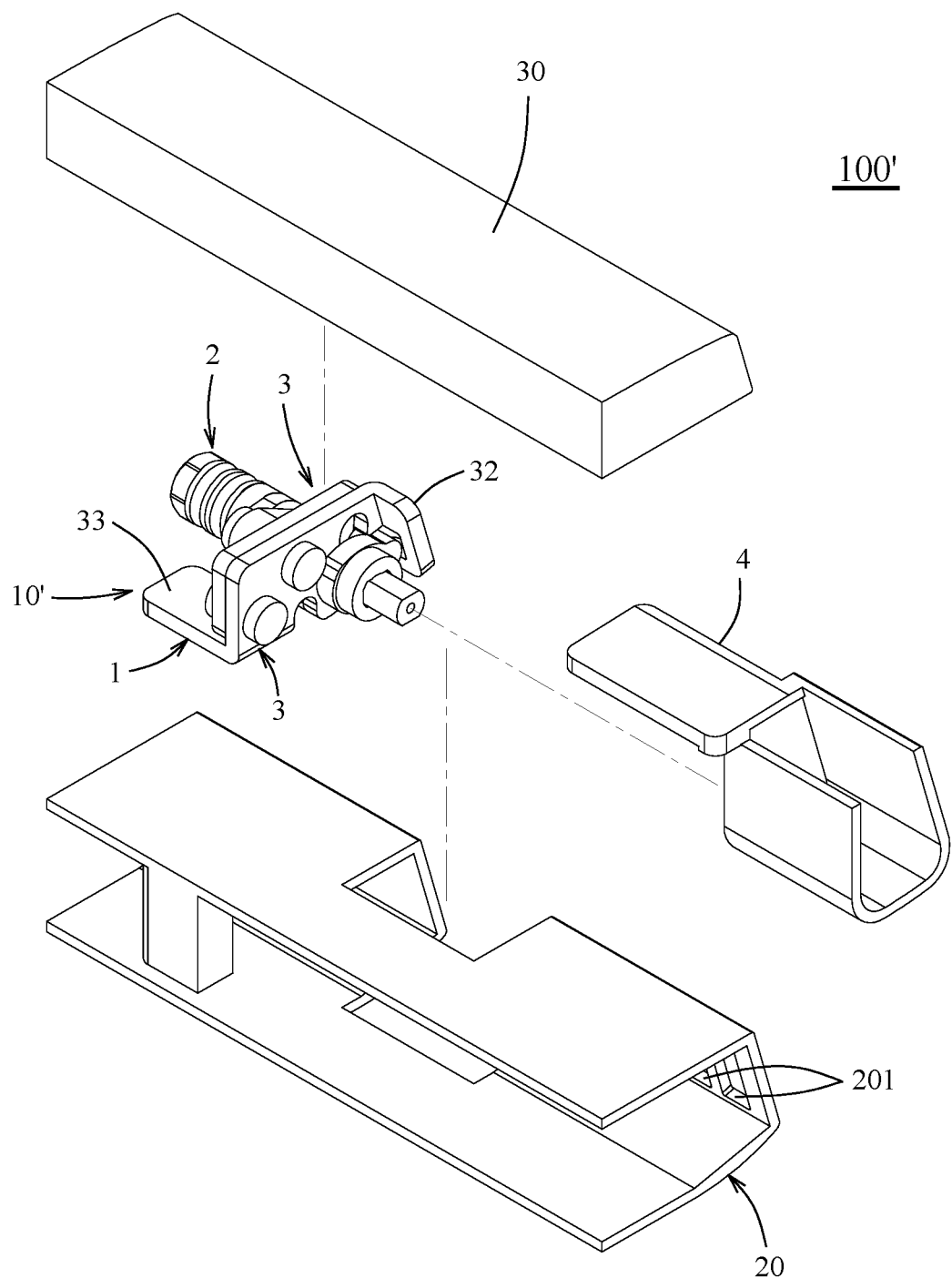
FIG. 15 is an exploded perspective view of the embodiment disposed between a first device part and a second device part of an electronic device.
Figure 16:
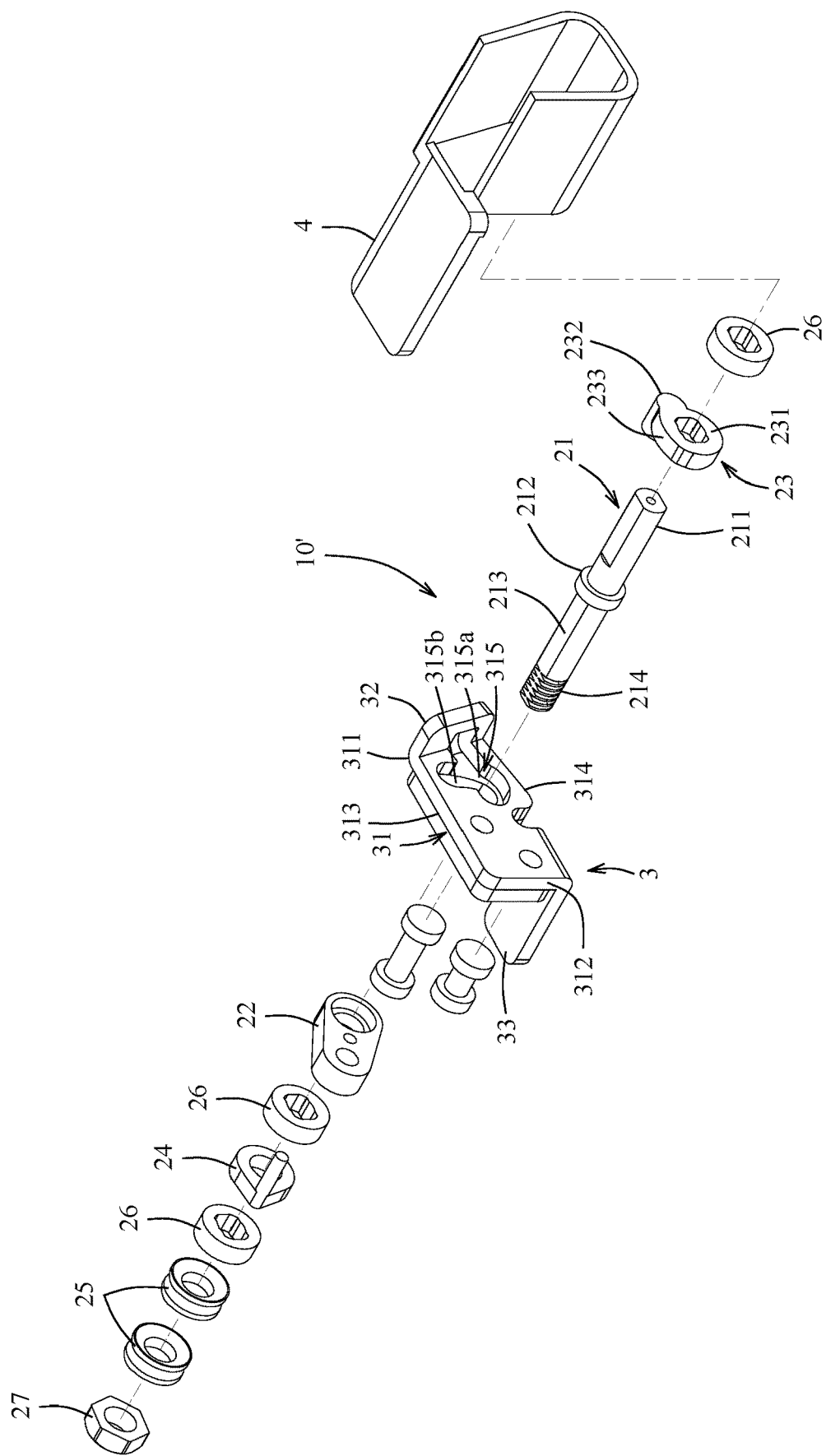
FIG. 16 is an exploded perspective view of the embodiment.

With reference to FIGS. 6 to 11, the second base seat 4 is driven to rotate the rotating unit 2 among an initial position, a first rotating position and a second rotating position. In the initial position, as shown in FIGS. 6 and 7, the rotating axle 21 is located in the first slot portion (315a), the first protrusion 232 of the cam piece 23 is located in the first slot portion (315a) adjacent to the first side 311 (i.e., at the horizontal surface (315f)). When it is desired to use the electronic device 100, the second device part 30 is opened relative to the first device part 20 to rotate the second base seat 4 along with the rotating axle 21 and the cam piece 23. During the rotation of the rotating axle 21 and the cam piece 23, the first protrusion 232 of the cam piece 23 abuts against and is moved along the lower edge of the first slot portion (315a) from the horizontal surface (315f) to the upward curved surface (315g) to bring the rotating axle 21 into an upward movement into the second slot portion (315b) and bring the linkage 22 into an upward pivoting action, and the second protrusion 233 is in abutting engagement with the lateral plate 32 so as to move the rotating unit 2 to the first rotating position, as shown in FIGS. 8 and 9. At this stage, the rotating axle 21 is raised such that the linkage 22 has a projected length which is projected in the horizontal direction and which is increased to hence create a height difference of the second device part 30 from the first device part 20, which creates more clearance therebetween. Thus, interfering of the second device part 30 with the first device part 20 during rotation is avoided, and more clearance facilitates heat dissipation with the heat dissipating holes 201 (see FIG. 2) of the first device part 20. Also, with the second protrusion 233 is in abutting engagement with the lateral plate 32, the rotating unit 2 may be rotated steadily without deflection. The second device part 30 can be further opened relative to the first device part 20 with a larger angle to rotate the second base seat 4 so as to move the rotating unit 2 to the second rotating position. When the rotating unit 2 is moved to the second rotating position from the first rotating position, the rotating axle 21 is kept in the second slot portion (315b), the second protrusion 233 is kept in abutting engagement with the lateral plate 32, and the first protrusion 232 is located in the distal end of the first slot portion (315a) (i.e., at the upward curved surface (315g)) so as to restrict further rotation of the second base seat 4 and the second device part 30, as shown in FIGS. 10 and 11.

Alternatively, the lateral plate 32 may be formed to extend from the upper side 313 of the base plate 31 to be in abutting engagement with the second protrusion 233.

Figure 17:
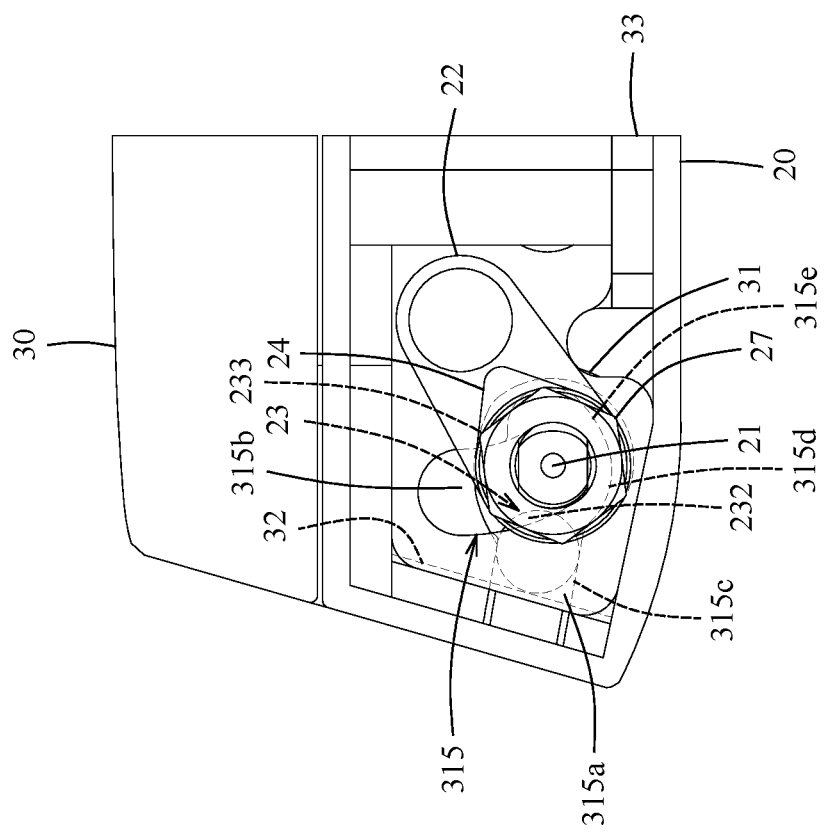
FIGS. 17 and 18 are a left side view and a right side view of the embodiment, illustrating the rotating unit in the initial position.
Figure 18:
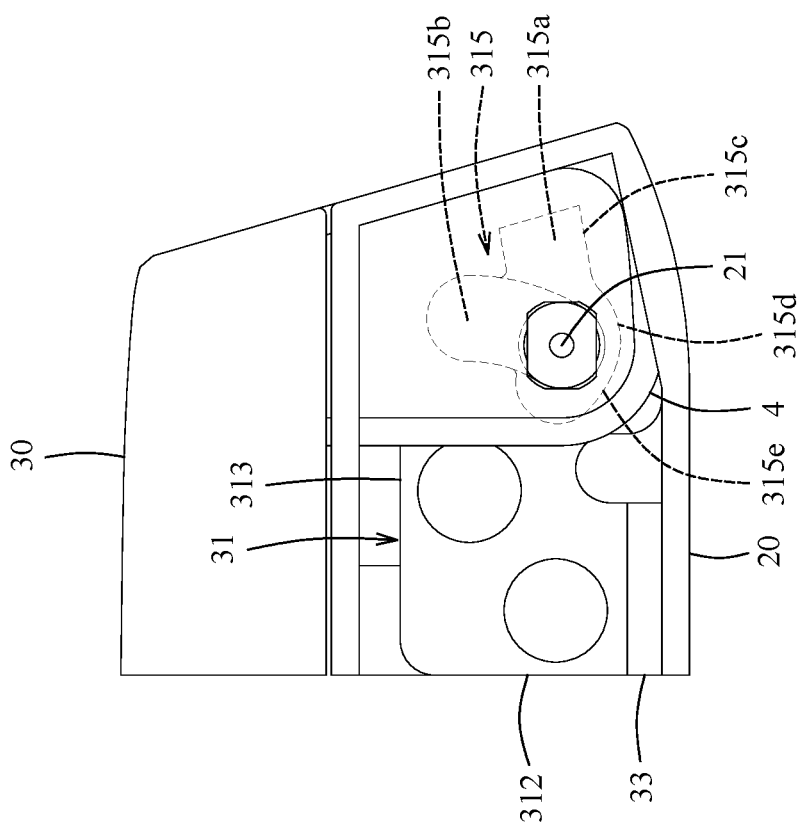

With reference to FIGS. 12 to 16, in another embodiment of the hinge 10' connectable between a first device part 20 and a second device part 30 of an electronic device 100', the lateral plate 32 of the first base seat 3 extends from the first side 311 of the base plate 31 and is inclined relative to an up-down direction such that an upper end of the lateral plate 32 is distant from the second side 312 by a distance that is smaller than a distance between a lower end of the lateral plate 32 and the second side 312. Additionally, as shown in FIGS. 17 and 18, the lower edge of the first slot portion (315*a*) has an inclined section (315*c*) which extends and is inclined downwardly from the first side 311 toward the second side 312, a downward curved section (315*d*) which extends and is curved downwardly from the inclined section (315*c*), and an upward curved section (315*e*) which extends and is curved upwardly from the downward curved section (315*d*). Moreover, the length of the linkage 22 is relatively shorter than that of the previous embodiment, and the pivot center of the linkage 22 on the base plate 31 is more close to the first side 311 and the lower side 314 than that of the previous embodiment.

Figure 19:
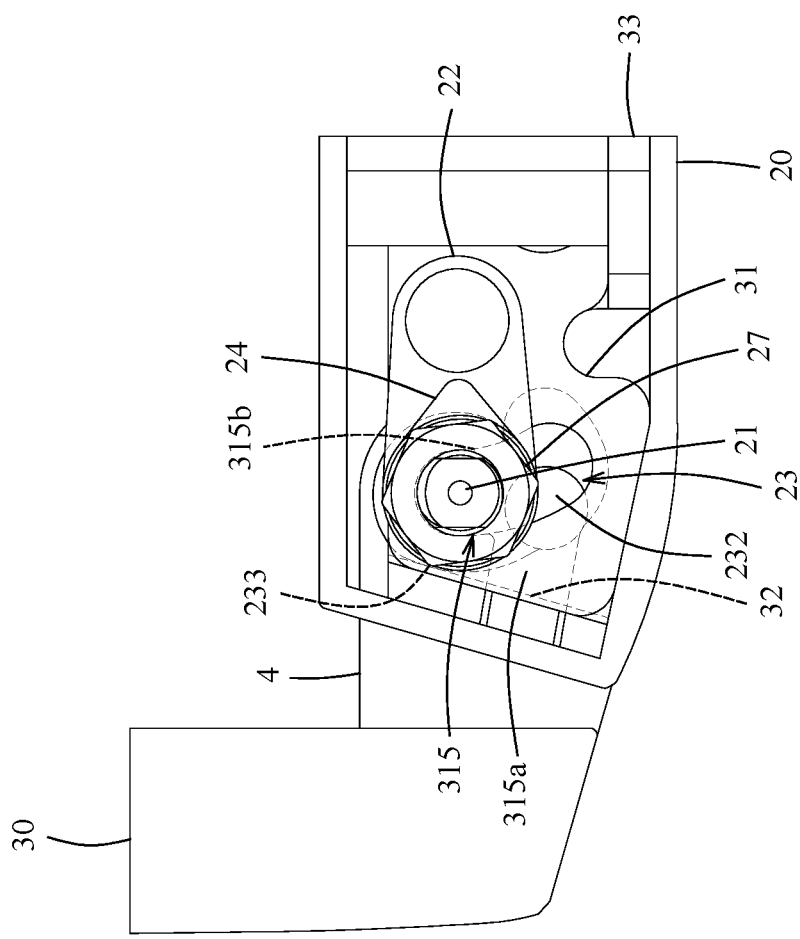
FIGS. 19 and 20 are a left side view and a right side view of the embodiment, illustrating the rotating unit in the first rotating position.
Figure 20:
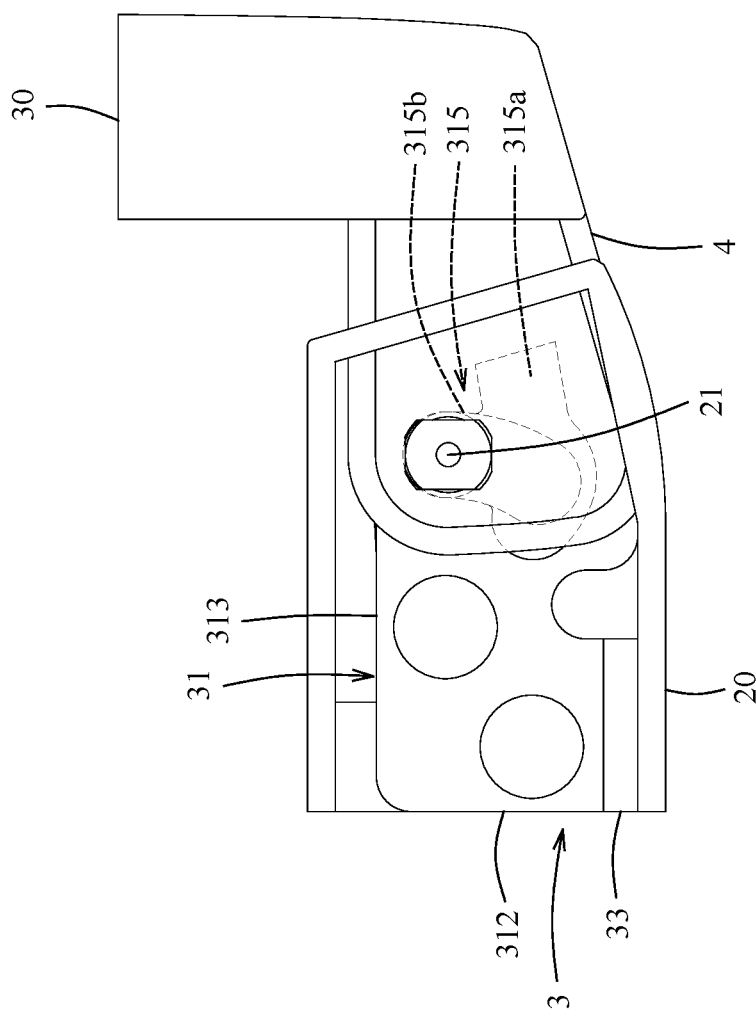
Figure 21:
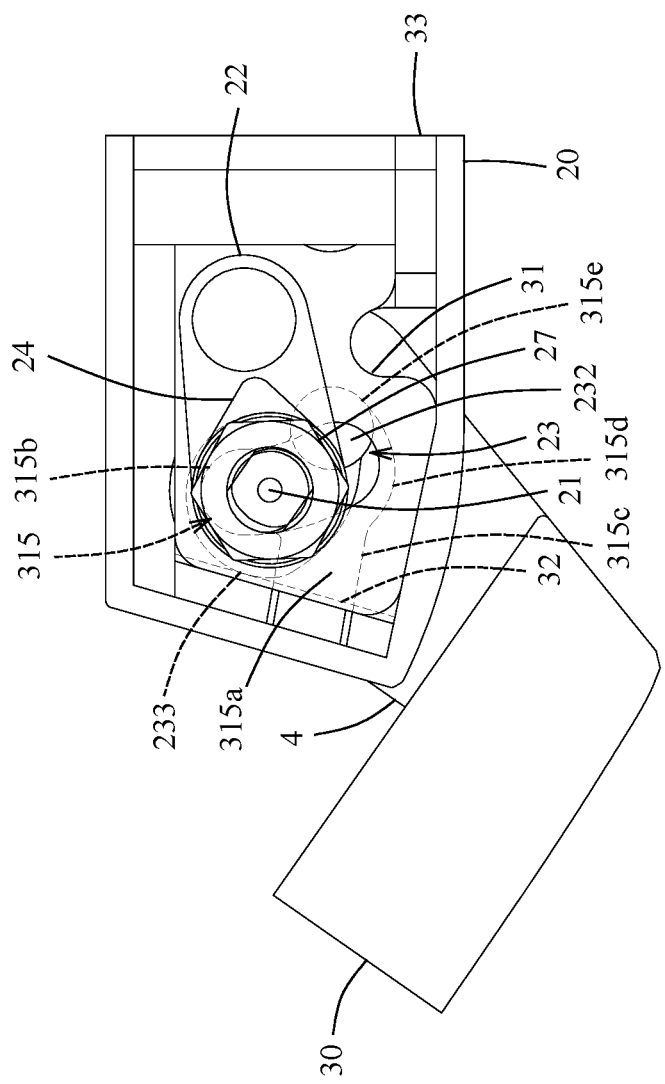
FIGS. 21 and 22 are a left side view and a right side view of the embodiment, illustrating the rotating unit in the second rotating position.
Figure 22:
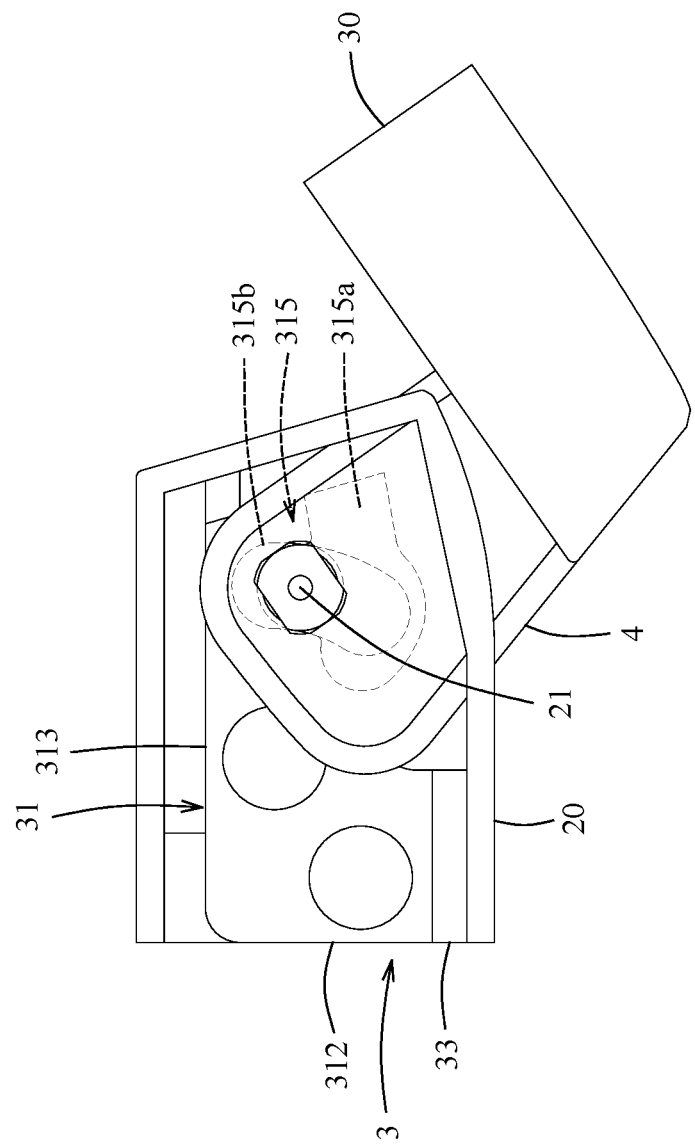

With reference to FIGS. 17 to 22, the second base seat 4 is driven to rotate the rotating unit 2 among an initial position, a first rotating position and a second rotating position. In the initial position, as shown in FIGS. 17 and 18, the rotating axle 21 is located in the first slot portion (315*a*), the first protrusion 232 of the cam piece 23 is located in the first slot portion (315*a*) adjacent to the first side 311 (i.e., at the inclined section (315*c*)). When it is desired to use the electronic device 100', the second device part 30 is opened relative to the first device part 20 to rotate the second base seat 4 along with the rotating axle 21 and the cam piece 23. During the rotation of the rotating axle 21 and the cam piece 23, the first protrusion 232 of the cam piece 23 abuts against and is moved along the lower edge of the first slot portion (315*a*) from the inclined section (315*c*) to the upward curved section (315*e*) to bring the rotating axle 21 into upward movement to the second slot portion (315*b*) and bring the linkage 22 into upward pivoting action, and the second protrusion 233 is in abutting engagement with the lateral plate 32 so as to move the rotating unit 2 to the first rotating position, as shown in FIGS. 19 and 20. At this stage, the rotating axle 21 is raised such that the linkage 22 has a projected length which is projected in the horizontal direction and which is increased to hence create a height difference of the second device part 30 from the first device part 20, which creates more clearance therebetween. Thus, interfering of the second device part 30 with the first device part 20 during rotation is avoided, and the clearance facilitates heat dissipation with the heat dissipating holes 201 (see FIG. 13) of the first device part 20. Also, with the second protrusion 233 in abutting engagement with the lateral plate 32, the rotating unit 2 can be rotated steadily without deflection. The second device part 30 can be further opened relative to the first device part 20 with a larger angle to rotate the second base seat 4 so as to move the rotating unit 2 to the second rotating position. When the rotating unit 2 is moved to the second rotating position from the first rotating position, the rotating axle 21 is kept in the second slot portion (315*b*) and slightly moved downwardly toward the downward curved section (315*d*) so that the second device part 30 does not interfere with the first device part 20, the second protrusion 233 is kept in abutting engagement with the lateral plate 32, and the first protrusion 232 is located at the upward curved section (315*e*) so as to restrict further rotation of the second base seat 4 and the second device part 30, as shown in FIGS. 21 and 22.

As illustrated, with the second base seat 4 driven to rotate with the rotating axle 21 and the cam piece 23, and with the first protrusion 232 of the cam piece 23 abutting against and moved along the lower edge of the first slot portion (315*a*), the rotating axle 21 is moved upwardly to the second slot portion (315*b*) to bring the linkage 22 into upward pivoting action so as to move the rotating unit 2 to the first rotating position. At this stage, the rotating axle 21 is raised to increase the projected length of the linkage 22 in the horizontal direction, and a height difference of the second device part 30 from the first device part 20 is created to create more clearance therebetween. Thus, interference of the second device part 30 with the first device part 20 during the rotation is avoided.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hinge connectable between a first device part and a second device part to permit the second device part to rotate relative to the first device part, comprising:
    a base seat unit including a first base seat for connecting with the first device part, and a second base seat for connecting with the second device part, said first base seat having a base plate, said base plate having a first side, a second side opposite to said first side, an upper side and a lower side opposite to said upper side, said base plate being formed with a moving slot, said moving slot having a first slot portion which extends from said first side toward said second side, and a second slot portion which is in communication with said first slot portion and which extends from said first slot portion toward said upper side; and a rotating unit including a rotating axle which movably extends through said moving slot and which is securely connected with said second base seat so as to be rotated with said second base seat, a linkage which is pivotally connected between said base plate and said rotating axle, and a cam piece which is securely mounted on said rotating axle, said cam piece having a cam surrounding portion which is securely sleeved on said rotating axle, and a first protrusion which projects radially from said cam surrounding portion and which is movably disposed in said first slot portion, wherein said second base seat is driven to rotate said rotating unit between an initial position, where said rotating axle is located in said first slot portion and said first protrusion of said cam piece is located in said first slot portion adjacent to said first side, and a first rotating position, and wherein, during rotation of said rotating axle and said cam piece, said first protrusion of said cam piece abuts against and is moved along a lower edge of said first slot portion to bring said rotating axle into an upward movement into said second slot portion and bring said linkage into an upward pivoting action so as to move said rotating unit to the first rotating position.

2. The hinge of claim 1, wherein said first base seat further has a lateral plate which extends from said first side and transverse to said base plate, said cam piece further having a second protrusion which projects radially from said cam surrounding portion and which is angularly spaced apart from said first protrusion to be in abutting engagement with said lateral plate.

3. The hinge of claim 2, wherein said lateral plate extends vertically.

4. The hinge of claim 2, wherein said lateral plate extends from said first side and is inclined relative to an up-down direction such that an upper end of said lateral plate is distant from said second side by a distance that is smaller than a distance between a lower end of said lateral plate and said second side.

5. The hinge of claim 2, wherein said rotating unit is further movable to a second rotating position, said first slot portion having a distal end which is remote from said first side and which is bordered by an upward curved surface, wherein, when said rotating unit is moved to the second rotating position from the first rotating position, said rotating axle is kept in said second slot portion and said first protrusion is located in said distal end of said first slot portion.

6. The hinge of claim 4, wherein said rotating unit is further movable to a second rotating position, said lower edge of said first slot portion having an inclined section which extends and is inclined downwardly from said first side toward said second side, a downward curved section which extends and is curved downwardly from said inclined section, and an upward curved section which extends and is curved upwardly from said downward curved section, wherein, when said rotating unit is moved to the second rotating position from the first rotating position, said rotating axle is kept in said second slot portion and moved downwardly toward said downward curved section, and said first protrusion is located at said upward curved section.

* * * * *